(12) United States Patent
Jarrell et al.

(10) Patent No.: US 7,421,908 B2
(45) Date of Patent: Sep. 9, 2008

(54) ELECTROMAGNETIC FLOW SENSING APPARATUS AND METHOD

(75) Inventors: Albert M. Jarrell, Lakeland, FL (US); Robert H. Batey, Orlando, FL (US)

(73) Assignee: Spirax Sarco, Inc., Blythewood, SC (US)

( * ) Notice: Subject to any disclaimer, the term of this patent is extended or adjusted under 35 U.S.C. 154(b) by 317 days.

(21) Appl. No.: 11/374,654

(22) Filed: Mar. 13, 2006

(65) Prior Publication Data

US 2006/0272426 A1 Dec. 7, 2006

Related U.S. Application Data

(60) Provisional application No. 60/660,944, filed on Mar. 11, 2005, provisional application No. 60/759,421, filed on Jan. 17, 2006, provisional application No. 60/778,041, filed on Mar. 1, 2006.

(51) Int. Cl.
*G01F 1/58* (2006.01)

(52) U.S. Cl. .................................. 73/861.12

(58) Field of Classification Search .............. 73/861.12, 73/761.13, 861.14–861.17
See application file for complete search history.

(56) References Cited

U.S. PATENT DOCUMENTS

| | | | |
|---|---|---|---|
| 4,454,767 A * | 6/1984 | Shinkai et al. ............ | 73/861.18 |
| 5,641,914 A | 6/1997 | Doll | |
| 5,670,724 A | 9/1997 | Batey | |
| 5,693,892 A | 12/1997 | Batey | |
| 5,708,212 A | 1/1998 | Batey | |
| 5,708,213 A | 1/1998 | Batey | |
| 5,808,208 A | 9/1998 | Doll | |
| 5,852,247 A | 12/1998 | Batey | |
| 6,789,432 B2 * | 9/2004 | Guazzoni et al. ......... | 73/861.12 |

* cited by examiner

*Primary Examiner*—Jewel V Thompson
(74) *Attorney, Agent, or Firm*—Nelson Mullins Riley & Scarborough LLP

(57) ABSTRACT

An apparatus for sensing liquid flow rate comprises a conduit for conducting a flow of liquid through it and a flow sensor. The flow sensor includes a fixed portion attached to a sidewall of the conduit. The fixed portion has a pair of stationary electrodes positioned in spaced apart relation and adapted to contact the liquid conducted through the conduit. The flow sensor further includes a cartridge portion adapted for removable engagement with the fixed portion. The cartridge portion has sensor terminals adapted to electrically engage the stationary electrodes. In addition, the flow sensor includes an electromagnetic coil operative to generate a magnetic field within the fluid flow.

42 Claims, 6 Drawing Sheets

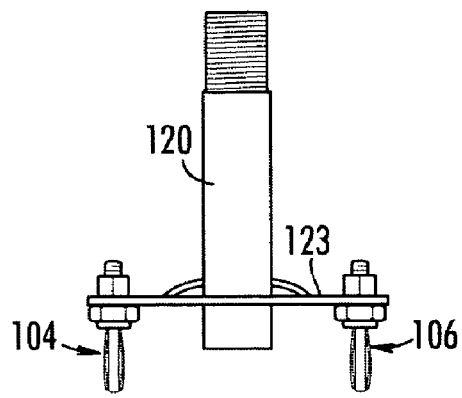
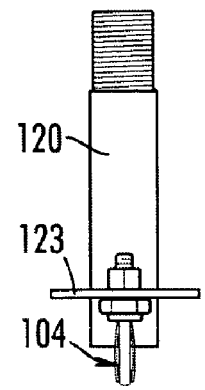
FIG. 6A  FIG. 6B
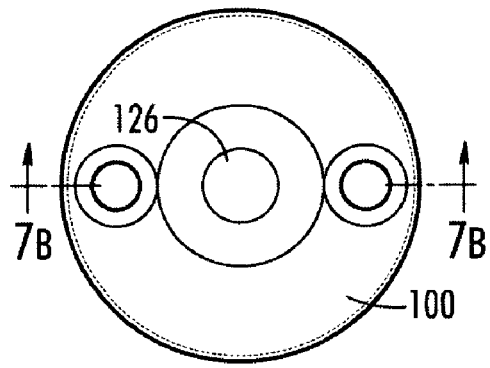
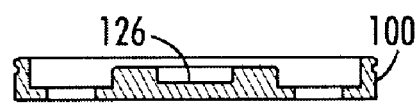
FIG. 7A  FIG. 7B
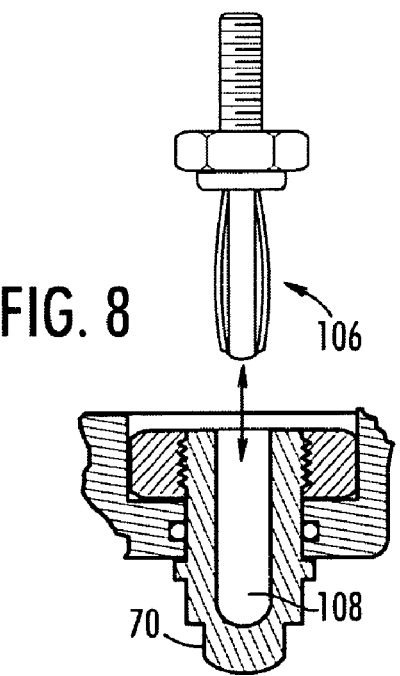
FIG. 8

ELECTROMAGNETIC FLOW SENSING APPARATUS AND METHOD

PRIORITY CLAIM

The present application is based upon and claims priority to provisional application Ser. No. 60/660,944, filed Mar. 11, 2005, provisional application Ser. No. 60/759,421, filed Jan. 17, 2006 and a provisional application Ser. No. 60/778,041 filed Mar. 1, 2006 entitled "Flow Sensing System and Method for Electromagnetic Flow Meter and Calibration" naming Albert M. Jarrell and Robert H. Batey as inventors. Each of the foregoing provisional applications is incorporated herein by reference.

BACKGROUND OF THE INVENTION

The present invention generally relates to the field of sensors, and more particularly to an apparatus and method for electromagnetic sensing of fluid flow.

A magnetic or electromagnetic liquid flow meter is commonly used for determining the flow rate or volumetric flow of a conductive liquid or media, such as fresh water or wastewater, flowing within a conduit. A magnetic flow meter operates in accordance with Faraday's Law stating that a moving conductor in a magnetic field generates a voltage, the amplitude of which is proportional to the velocity of the conductor. For a magnetic flow meter, the moving conductor is the liquid or media flowing adjacent the flow meter.

A conventional electromagnetic flow meter will now be described with reference to FIG. 1. This flow meter include a pair of electrodes 10 and 12 located at diametrically opposite positions across the opening of a flow tube 14. Typically, the electrodes are insulated from the flow tube by a liner 16. As shown, electrodes 10 and 12 are fixed on an axis at right angles to the axis of a pair of exciter coils 18 and 20. Exciter coils 18 and 20 are each fixed at diametrically opposite positions on the outside of flow tube 14.

Such conventional electromagnetic flow meters are calibrated and then used to measure flow passing through the flow tube. Occasionally, it is desirable to revalidate the calibration in order to ensure accuracy of the flow meter. It is normally not practical, however, to hydraulically revalidate the calibration on site. It is also not practical to withdraw the sensing embodiment from such typical systems to hydraulically check and revalidate the sensor on site using a hydraulic calibrator. Consequently, revalidation of typical electromagnetic flow meters is limited to electronic or electrical checks at a remote transmitter, which reveals only the state of the flow meter electronics and coils, without addressing mechanical movements that could have occurred and affected the hydraulic condition of the flow meter.

Ultrasonic time of flight meters may be used for calibration at a job site. Such meters are normally installed temporarily by being strapped to the outside of the pipe. They utilize the principle that sound waves emitted from outside the pipe will propagate through the media to a receiver and back again. The propagation is directly proportional to the mean velocity of that portion of the media in which the sound waves are directed. At zero flow, the sound waves reach both the emitter and the receiver and back again at the same time, without transit time delay. With flowing media, the sound waves take differing lengths of time between emitter and receiver, dependant on the media velocity and whether the sound waves travel against the flow stream or with the flow stream.

Accuracy of this type of flow meter is adversely affected if the sound waves are directed at only one thin section of the media velocity. Consequently, the mean velocity of the complete pipe cross section may not be measured. This causes significant errors if straight lengths of the pipe structure are relatively short, particularly as required of a magnetic flow meter.

Other inaccuracies result from the ultrasonic signal being affected by encrustation or other media coatings inside the pipe. It is also not always possible to install such a flow meter in the relatively long length of pipe necessary. Consequently, accuracy on site can be typically 1-10% of rate (i.e., the measured value may deviate 1-10% from actual value). That is insufficient for the required revalidated 0.5% accuracy required of a magmeter in the market.

Calibration has also been attempted using tracer techniques, typically involving transit time or dilution methods. A common tracer method operates on the principle of adding a tracer, such as sodium chloride (using conductivity probes) or potassium iodine (spectrophotometric probes), at a known point in the pipeline. The presence of the tracer is then detected at a known distance (volume) at another part of the pipeline. Volumetric flow can be inferred from the timing of such detection.

Dilution methods typically involve injecting the tracer at a fixed rate and concentration in the pipe structure. Its concentration in the media rises until it reaches a constant amount. When this occurs, water samples, by way of example, can be removed and the flow rate calculated from the injection volume, the undiluted tracer concentration at the point of injection and concentration at the point of constant dilution.

Problems with such dilution methods include undesirable time consumption, expensive work, need for skilled personnel and complex analysis methods. For example, mixing errors may introduce inaccuracies into the measurement. Accuracy is also dependant on internal sample pipe coatings and the distance between injection and sampling. In addition, lower velocities require longer injection and sampling distances. Moreover, the flow has to be turned off to install the equipment rendering such methods impractical in many situations.

Insertion master flow meters have also been utilized to calibrate electromagnetic flow meters. In this regard, a point velocity is typically measured from which the mean velocity is derived. This is often accomplished by traversing the insertion probe and taking an average of the velocity profile from which volumetric flow is inferred.

One problem with an insertion master flow meter is the excessive time which is often required. The probe must be installed via an isolating valve and pressure chamber. A hole is drilled in the pipe structure by a special under pressure drilling machine, unless the flow can be turned off.

Insertion master meters are typically turbine meters or vortex meters, which generally have accuracy of 1-4% depending on the specific knowledge of pipe diameter and obstruction factors. If an insertion "mag" meter is utilized, the accuracy may be in the range of 2-5% of measured rate of flow, which is insufficient for revalidation of magmeters. The reasons for this are low magnetic flux and very close electrode spacing. Again, this is greater than the revalidated 0.5% accuracy required of magmeters in the market.

These well known methods typically require the diameter of the sample pipe to be accurately known, since the error in volumetric flow is proportional to the square of the mean pipe diameter error. All these techniques and others are used to calibrate electromagnetic flow meters on-site by media passing through the pipeline. As such, they require minimum straight length of pipe typically from 10-20 diameters upstream of point of sensing or sampling. Such long pipe length requirements are often not practical, are not desirable in their use as a portable calibrator, nor are such straight lengths often available on site.

SUMMARY OF THE INVENTION

The present invention recognizes the foregoing and other disadvantages of prior art systems and methods.

In accordance with one aspect, the present invention provides an apparatus for sensing liquid flow rate. The apparatus comprises a conduit for conducting a flow of liquid therethrough and a flow sensor. The flow sensor includes a fixed portion attached to a sidewall of the conduit. The fixed portion has a pair of stationary electrodes positioned in spaced apart relation and adapted to contact the liquid conducted through the conduit.

The flow sensor further includes a cartridge portion adapted for removable engagement with the fixed portion. The cartridge portion has sensor terminals adapted to be in electrical communication with the stationary electrodes. In addition, the flow sensor includes an electromagnetic coil operative to generate a magnetic field within the fluid flow.

In some exemplary embodiments, the fixed portion is configured as a receiver in which the cartridge portion is slidably inserted. For example, the fixed portion may have a generally cylindrical configuration. In addition, the flow sensor may further include a retaining collar engaging exterior threads on the fixed portion. The cartridge portion may include an annular flange engaged by the retaining collar in such embodiments.

Preferably, the cartridge portion may include a cartridge housing in which components of the flow sensor are contained. For example, the components may be fixed in a potting compound located in the cartridge housing.

Often, the fixed portion may include an insulative base in which the stationary electrodes are mounted. In some such embodiments, the cartridge portion may include a magnetically permeable core having a protruding end portion protruding for engagement with the insulative base. The insulative base may define a recess in which the end portion of the magnetically permeable core is received.

Preferably, the stationary electrodes are each configured to define a terminal socket in which the sensor terminals are received. In many preferred embodiments, the sensor terminals are configured as elongate plugs for receipt in the terminal sockets. For example, the elongate plugs may be configured having a spring-like outer surface for positive engagement with the terminal sockets.

Another aspect of the present invention provides a method used in calibration of an electromagnetic flow sensor. One step of the method involves providing an electromagnetic flow sensor having a fixed portion attached to a flow conduit and a cartridge portion removably engaged with the fixed portion. The fixed portion of the flow sensor includes stationary terminals adapted to contact the liquid conducted through the conduit. The cartridge portion of the flow sensor has sensor terminals adapted to be in electrical communication with the stationary electrodes.

According to another step of the method, the cartridge portion is removed from the fixed portion. This may preferably involve slidably removing the cartridge portion from the fixed portion of the flow sensor so as to disengage the sensor terminals from the stationary electrodes. Another step of the method involves installing the cartridge portion in a calibration machine such that the sensor terminals are in electrical communication with electrodes thereof. The method may also include the step of testing calibration of the flow sensor using the calibration machine.

In accordance with preferred methodology, the calibration machine may be located on-site where the flow sensor is normally used. It will often be desirable for the calibration machine to be a stir test hydraulic calibrator.

Additional aspects of the present invention are provided by a flow sensor for use in measuring flow of liquid through a conduit. The sensor comprises a pair of stationary electrodes fixed with respect to the conduit and adapted to contact the liquid flowing therethrough. The electrodes are positioned in spaced apart relation to one another. The flow sensor further includes a receiver attached to a sidewall of the conduit. A cartridge portion, adapted for removable engagement with the receiver, has sensor terminals adapted to electrically engage the stationary electrodes. The cartridge portion includes an electromagnetic coil operative to generate a magnetic field.

Still further aspects of the present invention are achieved by an apparatus for sensing liquid flow rate comprising a conduit for conducting a flow of liquid therethrough and a flow sensor. The flow sensor includes a fixed portion attached to a sidewall of the conduit. The fixed portion has a pair of stationary electrodes positioned in spaced apart relation and adapted to contact the liquid conducted through the conduit.

The flow sensor further includes a cartridge portion adapted for removable engagement with the fixed portion. The cartridge portion has sensor terminals adapted to electrically engage the stationary electrodes. The stationary electrodes are each configured to define a terminal socket in which the sensor terminals are received and the sensor terminals are configured as elongate plugs for receipt in the terminal sockets.

Another aspect of the present invention is provided by an apparatus for sensing liquid flow rate. The apparatus comprises a conduit for conducting a flow of liquid therethrough and a flow sensor. The flow sensor includes a ramp, located in the conduit, which has a first inclined surface, a flat surface and a second inclined surface. The first and second inclined surfaces slope in opposite directions. A pair of electrodes are located on the flat surface of the ramp and are adapted to contact the liquid flowing therethrough. The electrodes are positioned in spaced apart relation to one another. In addition, the flow sensor includes an electromagnetic coil operative to generate a magnetic field within the fluid flow.

A still further aspect of the present invention is achieved by a calibration machine for use in calibrating an electromagnetic flow sensor. The machine comprises a housing defining a chamber in which a liquid is contained. A flow mechanism, such as a rotary paddle wheel, is operative to cause the liquid to flow in the chamber at a selected rate is also provided. At least one receiver is located on the housing for slidable receipt of a flow sensor cartridge having a pair of sensor terminals. The receiver has a pair of stationary electrodes adapted to contact the liquid flowing in the chamber. The stationary electrodes are engaged by respective sensor terminals when the flow sensor cartridge is inserted into the receiver.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIGS. 6A and 6B are front and side elevational views, respectively, of an assembly including the magnetically permeable core and sensor terminals of the cartridge portion of a flow sensor in accordance with the present invention;

FIG. 7A is a top plan view of an insulative base that may be used in the fixed portion of a flow sensor in accordance with the present invention;

FIG. 7B is a cross-sectional view taken along line 7B-7B of FIG. 7A;

FIG. 8 is an enlarged elevational view of a preferred sensor terminal being inserted into the stationary electrode;

Figure 1:
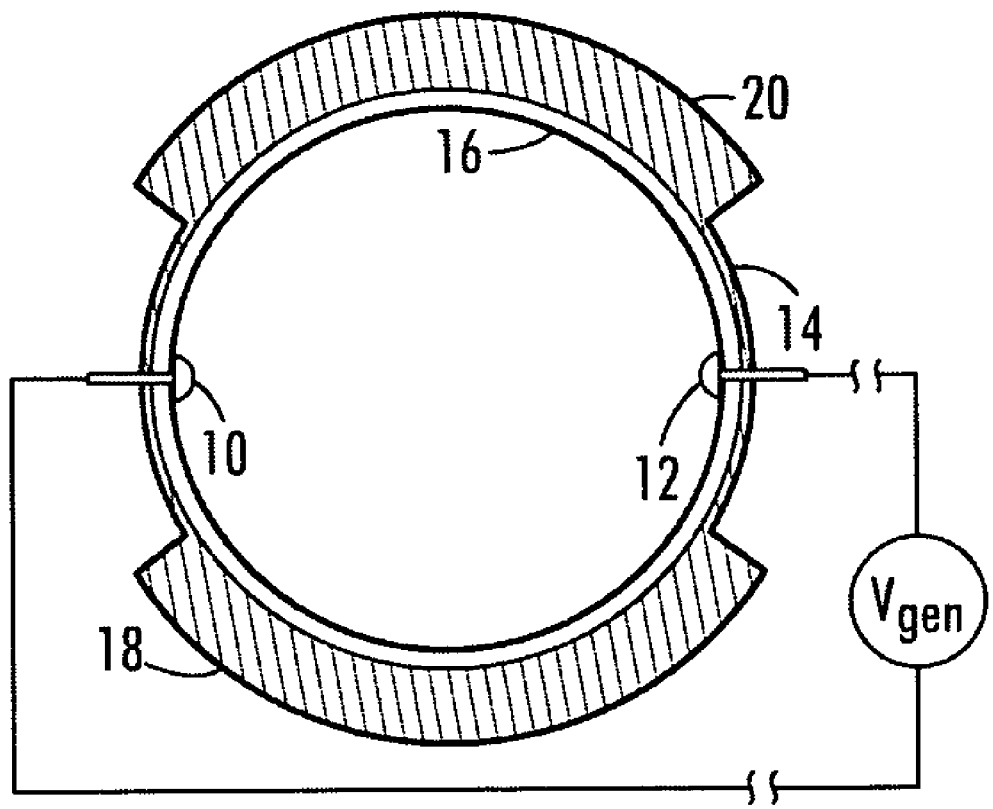
FIG. 1 is a diagrammatic representation of a prior art flow metering system.

Repeat use of reference characters in the present specification and drawings is intended to represent same or analogous features or elements of the invention.

DETAILED DESCRIPTION OF THE PREFERED EMBODIMENTS

It is to be understood by one of ordinary skill in the art that the present discussion is a description of exemplary embodiments only and is not intended as limiting the broader aspects of the present invention, such broader aspects being embodied in the exemplary constructions.

Various electromagnetic flow sensing devices are shown, for example, in U.S. Pat. Nos. 5,670,724; 5,693,892; 5,708,212; 5,708,213; and 5,852,247, each of which is incorporated herein by reference. The present invention provides an electromagnetic flow sensor used to measure fluid flow which includes a sensing portion removable from its metering environment without stopping the flow of the medium being monitored. Calibration and verification of the flow sensor may then be effectively and desirably performed on-site.

A sensor of the present invention is preferably carried within a relatively small sensor housing, compared to conventional sensors or flow meters. As above described, typical flow meters or relatively small sensors must have the following characteristics in order to provide the same hydraulic accuracy as conventional meters: (a) a minimum E:D ratio as follows, where E=distance between electrodes and D=pipe internal diameter; single or double sensors used on a flow tube E:D ratio >0.4 for quadruple sensors used on a flow tube E:D ratio >0.15; and (b) a plurality of sensors to average irregular velocity profiles resulting from short straight installation pipes, typically required by users to be five diameters upstream and two downstream.

Embodiments of the present invention may incorporate the principles above described, together with a magnetizing current >0.8 Amps base-to-peak in order to generate one desirable magnetic field strength, such that any area of conductive media at a specified distance away from the electrodes plays a significant role in determining the generated voltage across those electrodes. A specified distance would be typically determined by the flow tube diameter into which the sensors are placed. Exciter coil current magnitudes in typical conventional meters are generally not sufficient to achieve this. Consequently, typical electromagnetic meters require coils wrapped around a significant part of their external flow tube circumference.

In accordance with the present invention, the flow sensor may have a cartridge portion easily removable from a fixed portion of a sensor assembly attached to the flow tube. This allows the sensing cartridge to be initially hydraulic calibrated axially in a flow tube and subsequently by rotation of media when hydraulically re-validated. The hydraulic re-validation of calibration may now be performed at a job site using a stir test hydraulic calibrator (as will be described below with reference to FIGS. 9 and 10) at an accuracy of typically <0.5%, as is expected in the market for magnetic flowmeters.

Figure 2:
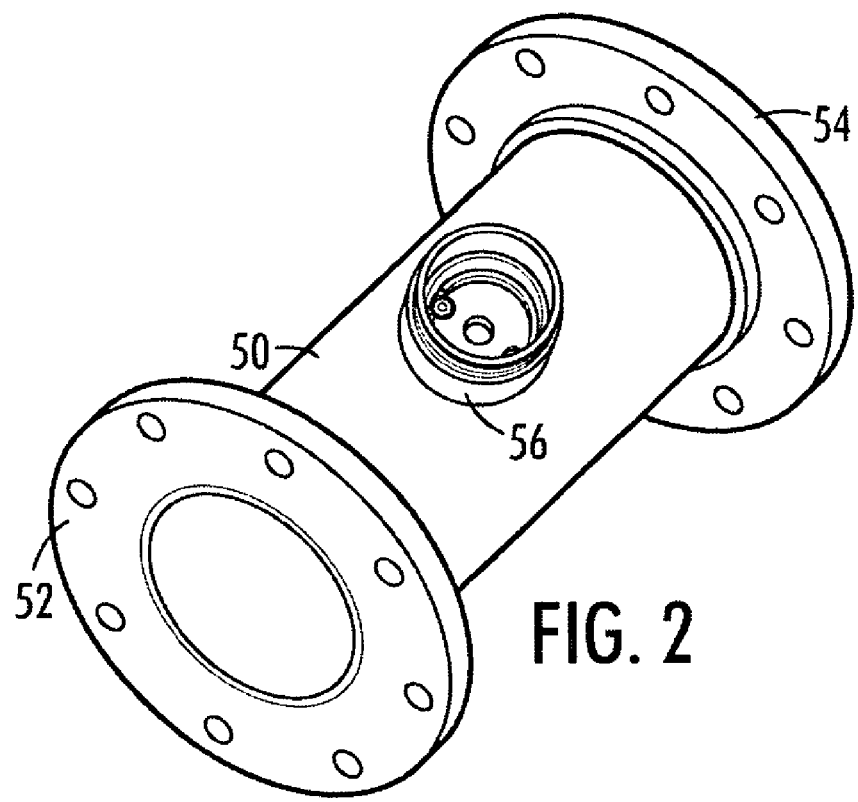
FIG. 2 is a perspective view illustrating a pipe section having a fixed portion of a flow sensor in accordance with the present invention attached thereto.
Figure 3:
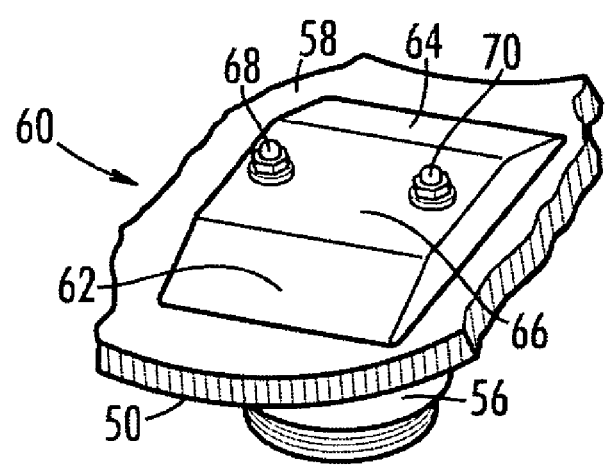
FIG. 3 is a perspective view of a portion of the inside of the pipe section shown in FIG. 2 so as to show the sensor electrodes.

Referring now to FIGS. 2 and 3, a flow meter in accordance with the present invention is used in association with a suitable flow conduit, such as flow tube 50. Flow tube 50 may be formed from a magnetic or non-magnetic metal (such as stainless steel) or plastic material (such as PVC). The flow tube is placed within a flow system for conducting a flowing media and utilizes process connections well known in the art. Alternatively, the flow tube may be placed within a system without any process connections, such that plain tube ends may be welded directly into mating pipe work. In this embodiment, a pair of end flanges 52 and 54 are located at opposite ends of the tube 50. A fixed portion 56 of a flow sensor, to be described in greater detail below, is attached to the exterior of flow tube 50. Since the sensor includes the functional equivalent of a liner as will be described, the flow tube itself does not require a liner.

Referring now specifically to FIG. 3, the inside surface 58 of flow tube 50 can be seen. In this embodiment, the flow sensor includes a ramp 60 made of any suitable non-magnetic material (such as stainless steel or plastic). Ramp 60 includes first and second inclined surfaces 62 and 64 separated by a flat surface 66. A pair of fixed electrodes 68 and 70 are located on the flat surface 66 so as to contact the liquid flowing through tube 50. As one skilled in the art will appreciate, suitable insulation should be provided at electrodes 68 and 70 to prevent shorting if ramp 60 is made of a conductive material.

The shape of ramp 60 advantageously conditions the flow profile and minimizes boundary layer effects caused by sensing flow at the pipe wall. Ramp 60 also has a straightening effect on swirl local to the sensor. In addition, ramp 60 serves to shed any solid debris that may be entrained in the flow stream. This is desirable with sewage flow measurements, by way of example.

Grounding for the sensor may be accomplished by using the uncoated portion of the metallic ramp, which is in contact with the internal diameter of the flow tube. This provides an excellent ground for the meter eliminating the need for grounding electrode or grounding plates even when used in lined or plastic pipe.

Figure 4:
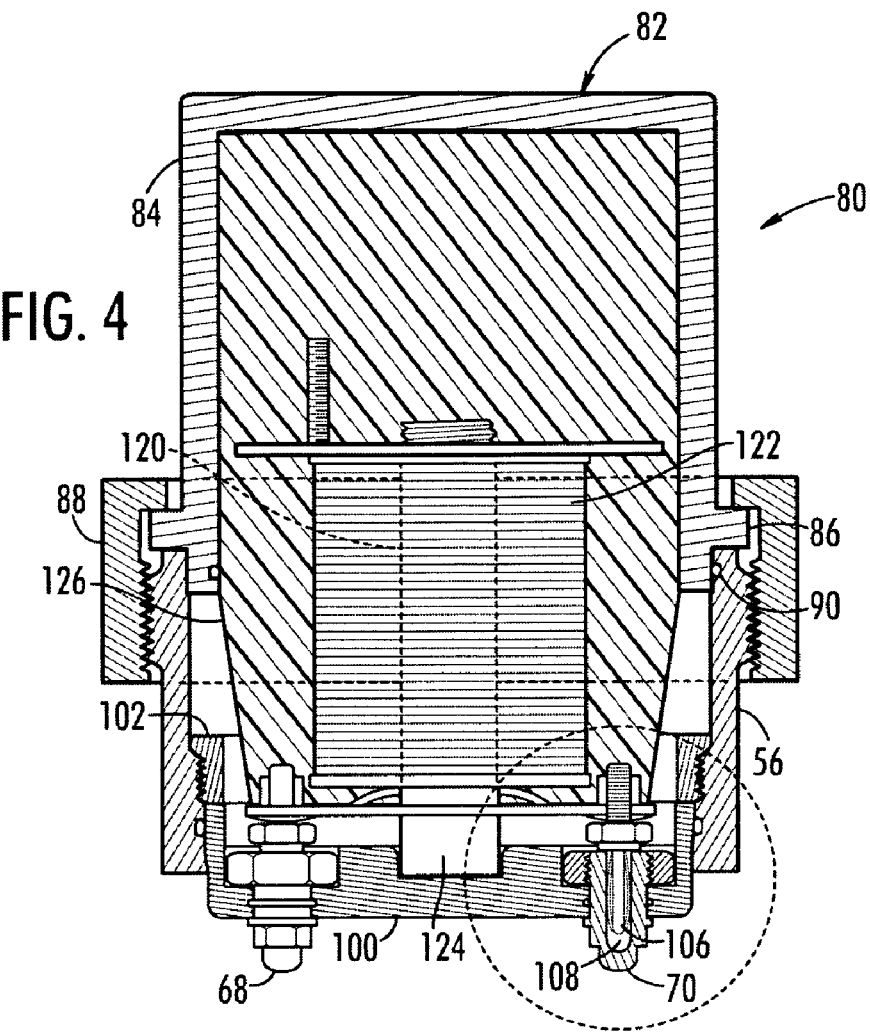
FIG. 4 is a partial cross-sectional view illustrating one embodiment of a flow sensor in accordance with the teachings of et present invention.
Figure 5:
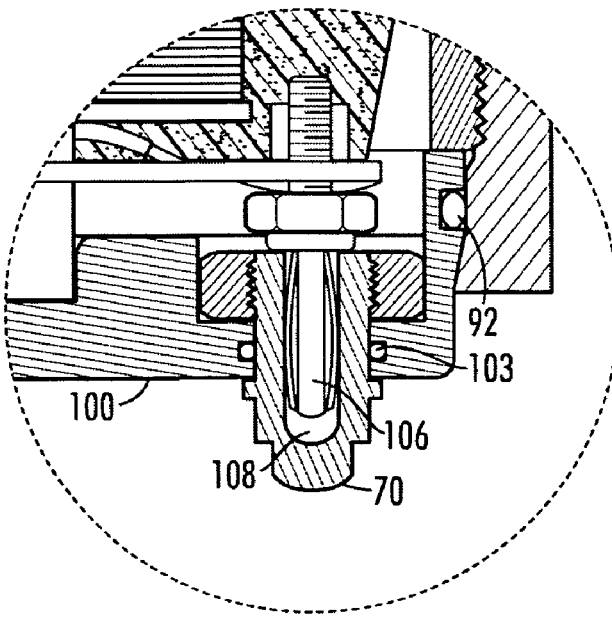
FIG. 5 is an enlarged view of the circled portion of FIG. 4.

Referring now to FIGS. 4 and 5, an electromagnetic flow sensor 80 in accordance with an embodiment of the present invention will be described. Receiver 56 formed of suitable metal or plastic (including but not limited to materials having magnetic characteristics) is affixed to the flow tube. Receiver 56 serves as a fixed portion of the flow sensor that is not removed for hydraulic recalibration. This may incorporate an electrical grounding artifice, such that vagabond currents in the pipe work or sensor parts have their electrical potentials equalized.

The flow sensor further includes a cartridge portion 82 which is removed when recalibration is desired. Cartridge portion 82 includes a housing 84 in which various components of the flow sensor are located. Housing 84 is preferably made of metal which may have magnetic characteristics. In this embodiment, housing 84 includes an integral flange 86 that functions as a stop ring. Flange 86 sits on the upper surface of receiver 56 when cartridge portion 82 is inserted therein. Flange 86 is pressed into contact with receiver 56 by a collar 88 engaging exterior threads on receiver 56.

Cartridge portion 82 may be removed or installed under media pressure from receiver 56 for hydraulic recalibration, without the need to incorporate expensive valves and pressure chambers as have often been required in the past. Because cartridge portion 82 is retained in position by stop ring 86 and collar 88, there is no significant variation in the diametrical or transverse movement of cartridge portion 82 relative to the flow tube internal diameter. Any variation in movement when the sensor cartridge is removed and re-assembled would otherwise affect repeatability and calibration.

Suitable sealing structures are provided to isolate the interior of flow sensor 80. For example, an O-ring 90 may be used to seal the cartridge assembly from the external environment. This also allows the flow sensor to be submersible in accordance with many embodiments of the invention. Another O-ring 92 may be used to seal components of receiver 56 from the internal pressure of the media. As will come to the minds of those skilled in the art, alternate embodiments may include chamfering edges or other sealing techniques without departing from the scope of the present invention.

In this embodiment, receiver 56 includes an insulative base 100 in which fixed electrodes 68 and 70 are mounted for making contact with the flowing liquid. As a result, the need for a liner typically used in the art is eliminated. One skilled in the art will appreciate that base 100 may take a variety of forms such as ramp 60 above. As shown in FIGS. 7A and 7B, for example, base 100 may generally take the form of a circular disc. In such embodiments, a threaded retainer ring 102 may be employed to secure base 100 in position within receiver 56.

Various penetration or window-styled materials of non-ferretic nature may be also used to form the base, as will come to the mind of those skilled in the art, now having the teachings of the present invention. By way of example, non-magnetic pipe and simple holes may be drilled through the pipe and electrodes inserted through the holes, secured with retention nuts. Insulation may be attained from a metal flow tube by inserting the electrodes in a Teflon or ceramic sleeve. By way of further example, an O-ring 103 (FIG. 5) or extension of the Teflon sleeve may be used to provide a hydraulic seal.

Cartridge portion 82 includes a pair of sensor terminals 104 and 106 (FIGS. 6A and 6B) that engage respective stationary terminals 68 and 70. In the illustrated embodiment, for example, terminals 104 and 106 are each formed as elongate plugs inserted into a respective terminal socket (such as terminal socket 108) defined in the stationary electrodes. In some presently preferred embodiments, the elongate plugs may be configured as so-called "banana plugs" having a spring-like outer surface for positive engagement with the terminal sockets. In other words, the plug inserts are inserted into the stationary electrodes and held by friction.

One skilled in the art will appreciate that the stationary electrodes do not need to be in the form of a post and the sensor terminals need not be a plug. On the dry side of the sensor, for example, a flat contact, or a contact spring (e.g. a standard battery contact), or a screw with a wire, may be used to provide electrical communication between the terminals and the electrodes.

Among the internal components of cartridge portion 82 is a magnetically permeable core 120 which improves the efficiency of coil assembly 122 in propagating the magnetic field into the flow stream of the media. As shown in FIGS. 6A and 6B, core 120 may form part of a sub-assembly including an insulator board 123 and terminals 104 and 106. In this embodiment, core 120 includes a protruding end portion 124 received in a recess 126 defined in base 100.

Coil assembly 122, generally powered by relatively high coil currents (1-6 Amps base-to-peak) and exciter frequency (33-40 Hz), provides a considerably higher magnetic field strength than well known meters in the art (typically 100-200 mA peak to peak @ 3-12 Hz). The high current and exciter frequencies available for use with embodiments of the present invention allow a signal including media noise ratio typically 50 times higher than conventional devices, since it can be shown that the signal to media noise ratio is primarily dependant on coil current and exciter frequency. Therefore, accuracy using clean water as a medium, by way of example, is the same when the electrodes are coated with sewage grease, calcium carbonate, algae or similar. One skilled in the art will appreciate, however, that teachings of the present invention are also applicable to other exciter coil currents and other frequencies.

As described above, cartridge portion 82 may be removed from receiver 56 for hydraulic recalibration. For one embodiment of the invention, as herein described by way of example, the removable portion of cartridge portion 82 may include housing 84, collar 88, O-ringO-ring 90, sensor terminals 104 and 106, core 120, and coil assembly 122. All may be encapsulated (or "potted") in a plastic or epoxy hard setting mold (as indicated at 126). All necessary cables for the coils and electrodes may emanate from a submersible cable gland in housing 84. All other parts may form the fixed portion of the flow sensor.

One skilled in the art will appreciate that the cartridge portion can be made into a variety of different shapes depending on the exigencies of the particular application. While the coil itself will generally be cylindrical, the overall cartridge portion, including potting material, can be shaped as desired. In fact, there may be an advantage to "shaping" the cartridge portion so that it can be fitted to the electrodes in only one way. For example, if the cartridge portion has an alignment feature (such as a groove or slot) in the potting material, it could engage with the receiver in only one weay, automatically aligning the contacts. It could also be square (with a slot or groove or other alignment method), or diamond shape, or a rhomboid, or any other shape that allows it to be coupled to the electrodes in only one way.

A flow sensor in accordance with the present invention may use a coil and other elements that are substantially smaller than those used in conventional flow meters having wrap around coils and liners. This allows space to incorporate various secondary sensing transducers (such as pressure sensors, level sensors etc.), cleaning artifices or inspection cameras that may be inserted under pressure via a relatively small pressure gland. This is impractical with conventional flow meters, due to their wrap around coils requiring substantial space around the flow tube and the liner.

In addition, embodiments of the present invention may incorporate a flow tube that does not require a liner and that contains relatively small flow sensor(s) such that the flow tube may be readily equipped with a removable universal joint and sealed brush for cleaning the stationary electrodes 68 and 70 and base 100. It may also be equipped with an inspection camera or secondary sensing transducers, such as for level and pressure measurement. The cleaning and camera facility may be part of a desirable inspection when the flow sensor of the present invention has its original calibration revalidated.

By way of example, one embodiment of an electromagnetic sensor in accordance with the teachings of the present invention may be removed from a fixed receiver forming part of the flow meter. With the sensor electrodes turned through 90 degrees from normal, such that they are in plane with an axis of a stir test hydraulic calibrator cylinder, the sensor (or multiple sensors) may be conveniently hydraulically checked using a rotational flow. In so doing, both electrical and electronic checks may be performed, as well as a hydraulic revalidation of calibration to account for movement of components relative to one another of the cartridge assembly. Such relative movement, occurring as a result of use, can cause significant errors not accounted for in prior art electrical or electronic on-site revalidation of magnetic flow meters.

An additional significant issue for many electromagnetic flow meters is magnetization of the assembly, or changes in the magnetic environment of the assembly which slightly perturbs the flux strength projected into the working fluid. Since detection of fluid flow is significantly dependent (through Faraday's laws) on magnetic flux, this would also lead to errors, and should be detectable by recalibration in accordance with the present invention.

Figure 9:
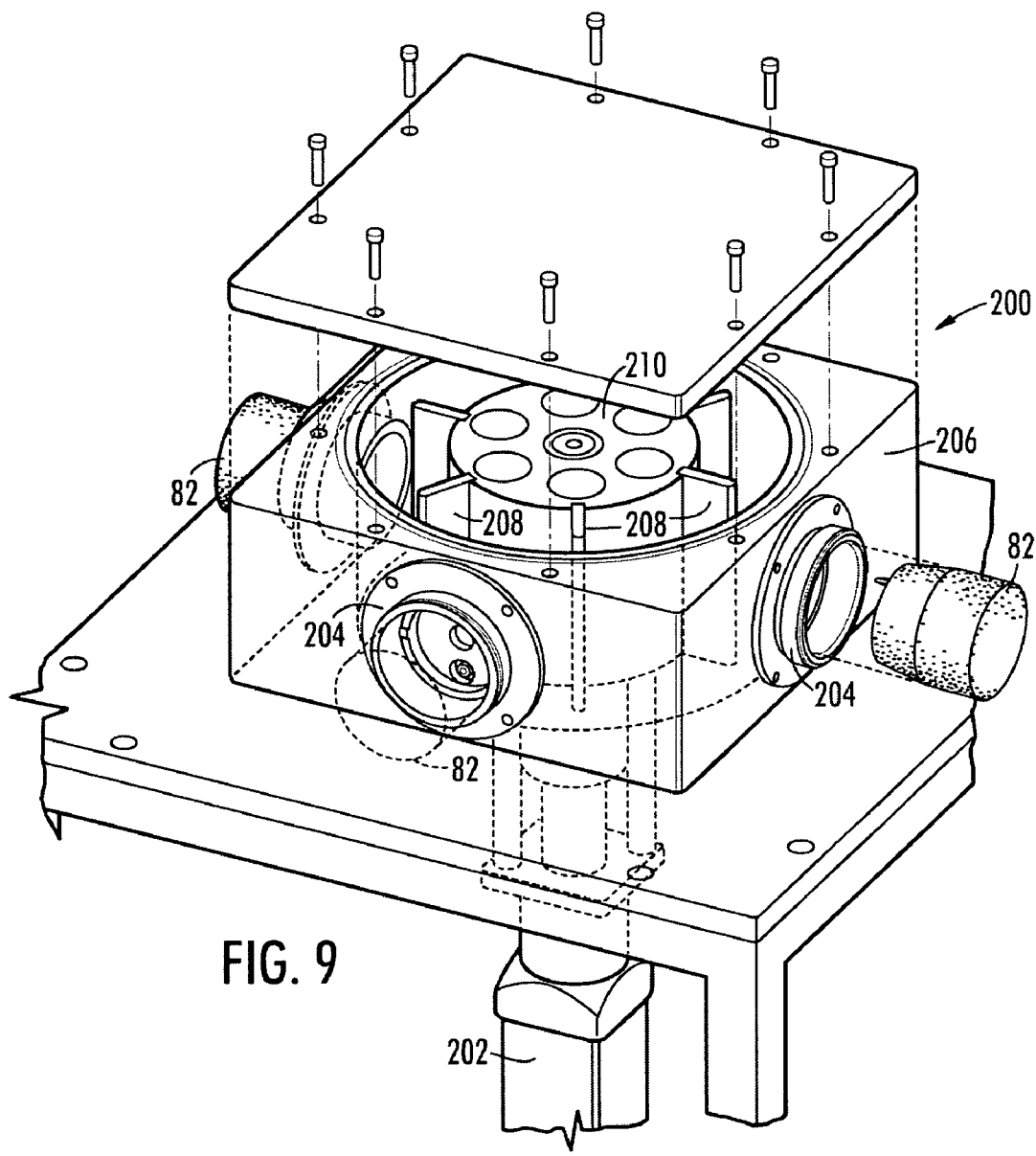
FIG. 9 is a perspective view of a calibration machine in accordance with the present invention with the top portion thereof removed to reveal internal components.

A calibration machine 200 in accordance with an embodiment of the present invention is illustrated in FIGS. 9 and 100. Machine 200, in the form of a stir test hydraulic calibrator, can be used in calibrating the flow sensor having the removable cartridge portion as described above. In addition, the machine 200 may be used for a calibration of other flow meters, such as those known as UniMags and TapMags (described in website www.advancedflow.com), by way of example.

Machine 200 may include a constant angular velocity electrical motor 202, programmable to provide typically five point velocities. A portable console may be provided for carrying the calibrator, the motor, a laptop computer and a printer. One or more receivers 204 are located on the housing or body 206 of machine 200. Body 204 further includes master cartridge sensors. These may be used as single, double or quadruple test and master cartridge sensors. Single and double sensors would typically be used for flow tubes from 2" to 42" in diameter. Quadruple sensors would generally be used for flow tubes from 48" in diameter and larger.

Calibrator body 206 may accommodate single and double test and master sensors. For quadruple sensors the master sensors may be on one horizontal plane and the tests sensors on another horizontal plane. Master cartridge sensor receivers are preferably orientated such that when the cartridge sensors are fitted, a center line between their sensor plugs are in the longitudinal axis of the calibrator body axis and in line with paddles 208 of a rotor 210. Rotor 210 functions as a flow mechanism operative to cause liquid to flow in the interior chamber of body 206 at a selected rate. One embodiment of machine 200 may include the cartridge sensor electrodes positioned at 90 degrees from their normal use in measuring axial flow in a flow tube, so that they may be calibrated using rotational flow in the calibrator.

Test cartridge sensor receivers may be similar to the master cartridge sensor receivers. The test sensors may be calibrated against master sensors at various hydraulic angular velocities. The master sensors are calibrated both axially in a flow tube and by rotation of water in the calibrator, with recorded results at various velocities. The test sensors may then be digitally matched to the master sensors with high accuracy, typically <0.5%.

Another method of calibration includes axially calibrating the flow sensor before dispatching from a factory. The flow sensors including the cartridge portions as above described are then removed and calibrated in the calibration machine by rotational hydraulic means, before factory dispatch. The relationship between the two methods is recorded. Future revalidation on subsequent on-site calibrations would be provided should the on-site calibrator results be within acceptable tolerances of the original factory calibration, typically within 0.5%. There may then be a record that the on-site sensors are related to the original axial flow calibration. In this way, desirable proof is made that there are no unacceptable movements or magnetization of cartridge sensor components relative to one another since the state of the original factory calibration. Further electrical and electronic checks may also be made as in common art revalidation.

Figure 10:
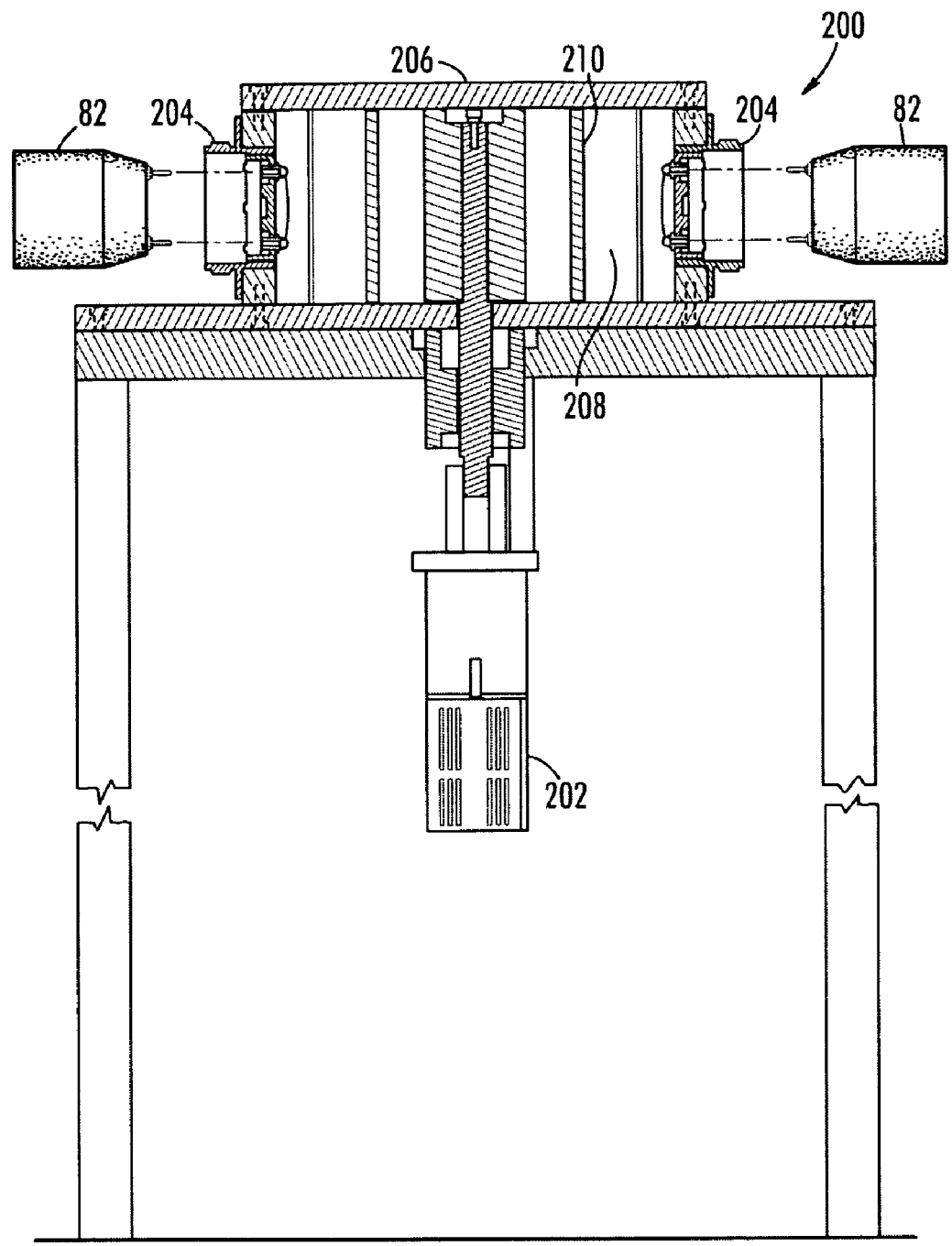
FIG. 10 is a cross-sectional view of the calibration machine of FIG. 9.

With continued reference to FIGS. 9 and 10, rotor 210 with paddles 208 causes angular movement of conductive liquid, such as water, over the surface of the calibrator sensor retainer electrodes inside the calibrator body 204. As such, the water movement cuts through the magnetic field generated by the assembled cartridge sensors. One embodiment of the present invention may include the portable calibrator used for on-site calibration of sensors described above.

In another embodiment of the present invention, calibrator body 206 is adapted to calibrate standard "insertion mag" meters. These sensors do not have a removable cartridge portion as described above, but are stand alone and can be flanged into the stir tester. In this case, one skilled in the art will appreciate that body 206 will need to be filled with liquid after the meters are installed. But since body 206 has a small volume, this is not impractical.

While preferred embodiments of the invention have been shown and described, modifications and variations may be made thereto by those of skill in the art without departing from the spirit and scope of the present invention. It should also be understood that aspects of those embodiments may be interchangeable in whole or in part. Furthermore, those of ordinary skill in the art will appreciate that the foregoing description is by way of example only and is not intended to be limitative of the invention described herein.

What is claimed is:

1. An apparatus for sensing liquid flow rate, said apparatus comprising:
   a conduit for conducting a flow of liquid therethrough;
   a flow sensor including:
   (a) a fixed portion attached to a sidewall of said conduit, said fixed portion having a pair of stationary electrodes positioned in spaced apart relation and adapted to contact the liquid conducted through said conduit;
   (b) a cartridge portion adapted for removable engagement with said fixed portion, said cartridge portion having sensor terminals adapted to be in electrical communication with said stationary electrodes; and
   (c) said cartridge portion including an electromagnetic coil operative to generate a magnetic field within the fluid flow.

2. An apparatus as set forth in claim 1, wherein said fixed portion is configured as a receiver in which said cartridge portion is slidably inserted.

3. An apparatus as set forth in claim 2, wherein said fixed portion has a generally cylindrical configuration.

4. An apparatus as set forth in claim 2, wherein said flow sensor further includes a retaining collar engaging exterior threads on said fixed portion.

5. An apparatus as set forth in claim 4, wherein said cartridge portion includes an annular flange engaged by said retaining collar.

6. An apparatus as set forth in claim 1, wherein said cartridge portion includes a cartridge housing in which components of said flow sensor are contained.

7. An apparatus as set forth in claim 6, wherein said components of said flow sensor are fixed in a potting compound located in said cartridge housing.

8. An apparatus as set forth in claim 1, wherein said fixed portion includes an insulative base in which said stationary electrodes are mounted.

9. An apparatus as set forth in claim 8, wherein said cartridge portion includes a magnetically permeable core having a protruding end portion.

10. An apparatus as set forth in claim 9, wherein said insulative base defines a recess in which said end portion of said magnetically permeable core is received.

11. An apparatus as set forth in claim 8, wherein said insulative base defines a ramp located in said conduit, said ramp having a first inclined surface and a second inclined surface sloping in opposite directions.

12. An apparatus as set forth in claim 1, wherein said stationary electrodes are each configured to define a terminal socket in which said sensor terminals are received.

13. An apparatus as set forth in claim 12, wherein said sensor terminals are configured as elongate plugs for receipt in said terminal sockets.

14. An apparatus as set forth in claim 13, wherein said elongate plugs are configured having a spring-like outer surface for positive engagement with said terminal sockets.

15. An apparatus as set forth in claim 1, wherein said cartridge portion includes a magnetically permeable core.

16. A method used in calibration of an electromagnetic flow sensor, said method comprising steps of:
   (a) providing an electromagnetic flow sensor having:
      (i) a fixed portion attached to a flow conduit and a cartridge portion removably engaged with said fixed portion,
      (ii) said fixed portion having stationary terminals adapted to contact the liquid conducted through said conduit, and
      (iii) said cartridge portion having sensor terminals adapted to be in electrical communication with said stationary electrodes;
   (b) removing said cartridge portion from said fixed portion; and
   (c) installing said cartridge portion in a calibration machine such that said sensor terminals are in electrical communication with electrodes thereof.

17. A method as set forth in claim 16, further including the step of (d) testing calibration of said flow sensor using said calibration machine.

18. A method as set forth in claim 17, wherein said calibration machine is located on-site where the flow sensor is normally used.

19. A method as set forth in claim 18, wherein said calibration machine is a stir test hydraulic calibrator.

20. A method as set forth in claim 16, wherein step (b) involves slidably removing said cartridge portion from said fixed portion of said flow sensor so as to disengage said sensor terminals from said stationary electrodes.

21. A method as set forth in claim 20, wherein said fixed portion of said flow sensor has a generally cylindrical configuration.

22. A method as set forth in claim 20, wherein said stationary electrodes are each configured to define a terminal socket in which said sensor terminals are received.

23. A method as set forth in claim 22, wherein said sensor terminals are configured as elongate plugs for receipt in said terminal sockets.

24. A method as set forth in claim 16, wherein said cartridge portion includes a magnetically permeable core.

25. A flow sensor for use in measuring flow of liquid through a conduit, said sensor comprising:
   a pair of stationary electrodes fixed with respect to said conduit and adapted to contact the liquid flowing therethrough, said electrodes being positioned in spaced apart relation to one another;
   a receiver attached to a sidewall of said conduit;
   a cartridge portion adapted for removable engagement with said receiver, said cartridge portion having sensor terminals adapted to electrically engage said stationary electrodes; and
   said cartridge portion including an electromagnetic coil operative to generate a magnetic field.

26. A flow sensor as set forth in claim 25, wherein said cartridge portion is slidably inserted with respect to said receiver.

27. A flow sensor as set forth in claim 26, wherein said fixed portion has a generally cylindrical configuration.

28. A flow sensor as set forth in claim 25, wherein said cartridge portion includes a cartridge housing in which components of said flow sensor are contained.

29. A flow sensor as set forth in claim 28, wherein said components of said flow sensor are fixed in a potting compound located in said cartridge housing.

30. A flow sensor as set forth in claim 25, wherein said stationary electrodes are each configured to define a terminal socket in which said sensor terminals are received.

31. A flow sensor as set forth in claim 30, wherein said sensor terminals are configured as elongate plugs for receipt in said terminal sockets.

32. A flow sensor as set forth in claim 31, wherein said elongate plugs are configured having a spring-like outer surface for positive engagement with said terminal sockets.

33. A flow sensor as set forth in claim 25, wherein said cartridge portion includes a magnetically permeable core.

34. An apparatus for sensing liquid flow rate, said apparatus comprising:
   a conduit for conducting a flow of liquid therethrough;
   a flow sensor including:
      (a) a fixed portion attached to a sidewall of said conduit, said fixed portion having a pair of stationary electrodes positioned in spaced apart relation and adapted to contact the liquid conducted through said conduit;
      (b) a cartridge portion adapted for removable engagement with said fixed portion, said cartridge portion having sensor terminals adapted to electrically engage said stationary electrodes; and
      (c) wherein said stationary electrodes are each configured to define a terminal socket in which said sensor terminals are received and said. sensor terminals are configured as elongate plugs for receipt in said terminal sockets.

35. An apparatus as set forth in claim 34, wherein said elongate plugs are configured having a spring-like outer surface for positive engagement with said terminal sockets.

36. An apparatus as set forth in claim 34, wherein said cartridge portion and said fixed portion are shaped to facilitate mating in a selected orientation.

37. An apparatus as set forth in claim 36, wherein said cartridge portion and said first portion have aligning features.

38. An apparatus for sensing liquid flow rate, said apparatus comprising:
- a conduit for conducting a flow of liquid therethrough;
- a flow sensor including:
  - (a) a ramp located in said conduit, said ramp having a first inclined surface, a flat surface and a second inclined surface, said first and second inclined surfaces sloping in opposite directions;
  - (b) a pair of electrodes located on said flat surface of said ramp and adapted to contact the liquid flowing therethrough, said electrodes being positioned in spaced apart relation to one another;
  - (c) an electromagnetic coil operative to generate a magnetic field within the fluid flow.

39. A calibration machine for use in calibrating an electromagnetic flow sensor, said machine comprising:
- a housing defining a chamber in which a liquid is contained;
- a flow mechanism operative to cause said liquid to flow in said chamber at a selected rate; and
- at least one receiver located on said housing for slidable receipt of a flow sensor cartridge having a pair of sensor terminals.

40. A calibration machine as set forth in claim 39, wherein said receiver has a pair of stationary electrodes adapted to contact the liquid flowing in said chamber, said stationary electrodes being engaged by respective of said sensor terminals when said flow sensor cartridge is inserted into said receiver.

41. A calibration machine as set forth in claim 40, wherein said at least one receiver comprises a plurality of receivers.

42. A calibration machine as set forth in claim 39, wherein said flow mechanism comprises a rotary paddle wheel.

* * * * *